(12) United States Patent
Gruener et al.

(10) Patent No.: US 8,549,060 B2
(45) Date of Patent: Oct. 1, 2013

(54) CONCEPT FOR REALISTIC SIMULATION OF A FREQUENCY SPECTRUM

(75) Inventors: Uwe Gruener, Thalmaessing (DE); Anreas Klose, Nuremberg (DE); Rainer Perthold, Weisendorf (DE); Roland Zimmermann, Nittendorf (DE)

(73) Assignee: Innovationszentrum fuer Telekommunikationstechnik GmbH IZT, Erlangen (DE)

( * ) Notice: Subject to any disclaimer, the term of this patent is extended or adjusted under 35 U.S.C. 154(b) by 958 days.

(21) Appl. No.: 12/441,107

(22) PCT Filed: Aug. 30, 2007

(86) PCT No.: PCT/EP2007/007593
§ 371 (c)(1),
(2), (4) Date: Dec. 16, 2009

(87) PCT Pub. No.: WO2008/031504
PCT Pub. Date: Mar. 20, 2008

(65) Prior Publication Data
US 2010/0121617 A1    May 13, 2010

(30) Foreign Application Priority Data
Sep. 15, 2006 (DE) .......................... 10 2006 043 411

(51) Int. Cl.
*G06F 17/14* (2006.01)

(52) U.S. Cl.
USPC ............ 708/405; 708/303; 708/403; 708/404

(58) Field of Classification Search
None
See application file for complete search history.

(56) References Cited

U.S. PATENT DOCUMENTS

| | | | |
|---|---|---|---|
| 5,740,128 A | 4/1998 | Hossack et al. | |
| 7,010,556 B1 | 3/2006 | Marro et al. | |
| 7,088,791 B2 * | 8/2006 | Magee | 375/340 |
| 7,113,559 B2 * | 9/2006 | Baas et al. | 375/350 |
| 7,139,320 B1 * | 11/2006 | Singh et al. | 375/260 |
| 2002/0150037 A1 * | 10/2002 | Bao et al. | 370/208 |

FOREIGN PATENT DOCUMENTS

| | | |
|---|---|---|
| EP | 0195573 A2 | 9/1986 |
| EP | 0195573 B1 | 9/1986 |
| WO | WO 00/42814 | 7/2000 |

\* cited by examiner

*Primary Examiner* — Michael D Yaary
(74) *Attorney, Agent, or Firm* — Michael A. Glenn; Perkins Coie LLP (57) ABSTRACT

An apparatus for simulating a signal composed of a plurality of individual signals from respective signal locations at a simulation location, having a provider for providing the plurality of individual signals in the time domain, a transformer for transforming the individual signals to the frequency domain, a processor for processing the individual signals transformed to the frequency domain each depending on a signal channel existing between the simulation location and the respective signal location, a combiner for combining the processed individual signals transformed to the frequency domain to a combined signal, and a transformer for transforming the combined signal to the time domain for generating the simulated combined signal at the simulation location.

20 Claims, 7 Drawing Sheets

CONCEPT FOR REALISTIC SIMULATION OF A FREQUENCY SPECTRUM

CROSS-REFERENCE TO RELATED APPLICATIONS

This application is a U.S. national entry of PCT Patent Application Serial No. PCT/EP2007/007593 filed 30 Aug. 2007, and claims priority to German Patent Application No. 102006043411.0-35 filed 15 Sep. 2006, each of which is incorporated herein by reference.

BACKGROUND OF THE INVENTION

The present invention relates to an apparatus and a method for simulating a signal composed of plurality of individual signals, as it can be used in particular for realistic simulation of a frequency spectrum.

Methods for localization of transmitters or emitters of radio waves, respectively, such as radio direction finding, are methods where an individual position of a radio direction finder or a position and/or direction of a transmitter or emitter, respectively, can be determined, for example by direction finding or timing of a radio signal. Frequently, a relative velocity between transmitter and receiver can also be determined. Radio direction finders generally behave purely passive and select only electromagnetic waves that are radiated at other locations by other devices. Generally, for radio direction finding, one direction finding receiver and one or several antennas are necessitated.

For testing receivers or radio direction finders, respectively, that are used, for example, in radio detection or radio direction finding, respectively, in a realistic scenario, it is necessitated to generate a plurality of modulated time-varying signals or emitter signals, respectively, having realistic signal content within a frequency range that is as broad as possible. Further, for testing radio direction finders, it is necessitated to provide this plurality of signals at several outputs of a test device with exactly defined phase, frequency and level differences.

Figure 7:
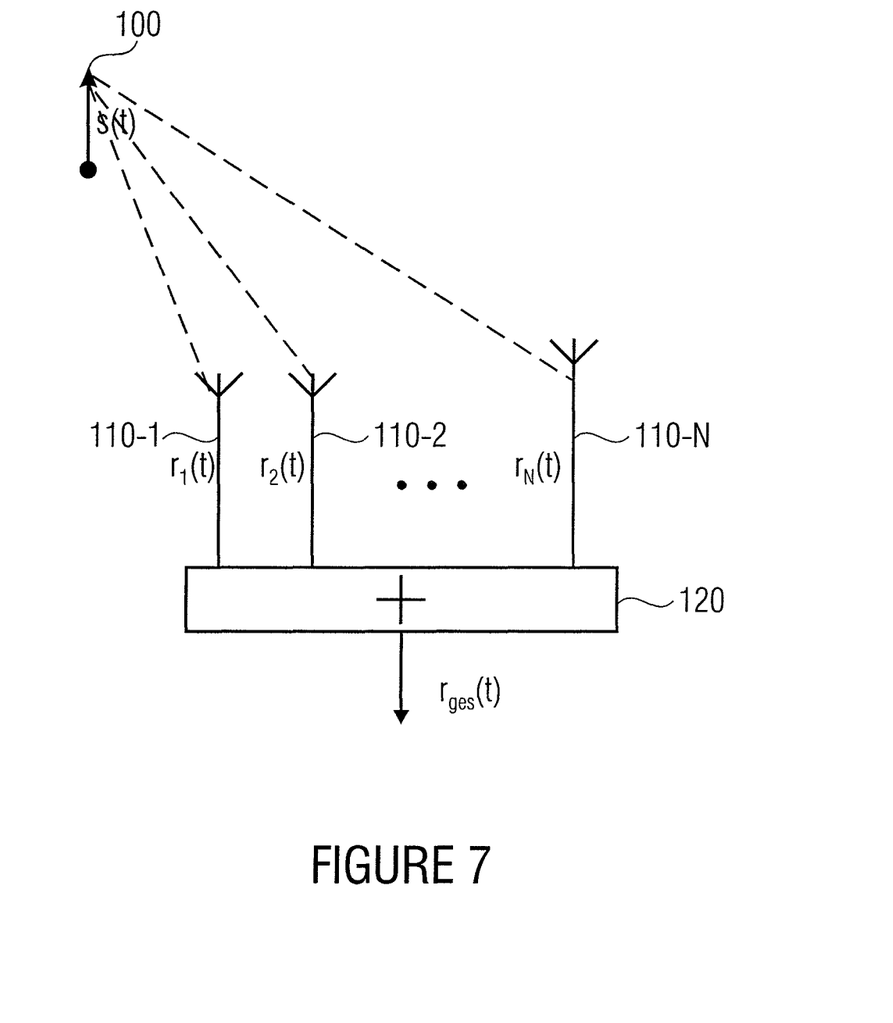
FIG. 7 is a schematic illustration of a scenario of direction finding of a transmitter having a radio direction finder.

FIG. 7 shows the principle of a so-called interferometer direction finding, wherein phase relationships between several spatially separate similar individual antennas are used for direction finding.

FIG. 7 shows a transmitter or emitter 100, respectively, a plurality of receiving antennas 110-1, 110-2, . . . , 110-N and a combination means 120. The emitter 100 emits a modulated time-varying emitter signal s(t) at a signal location, which is received by the receiving antennas 110-1 to 110-N. Since the receiving antennas 110-1 to 110-N are spatially separate from each other, the respective receiving signals $r_1(t)$ to $r_N(t)$ have different phase relationships to each other. For further processing or determination of the signal location, respectively, the different receiving signals $r_1(t)$ to $r_N(t)$ can be combined to an overall signal or combined signal $r_{ges}(t)$ by the combination means 120.

The scenario shown in FIG. 7 could also be reversed. Here, the antennas 110-1, 110-2, . . . , 110-N could act, for example, as transmitting antennas at different signal locations and transmit transmission or emitter signals, respectively, $s_1(t)$ to $s_N(t)$ to a receiver 100, which then receives a signal $s_{ges}(t)$ composed of the plurality of individual signals $s_1(t)$ to $s_N(t)$.

In practical tests of receivers or radio direction finders, respectively, that are to take place in a laboratory, it is advantageous to simulate realistic scenarios with regard to signal and receiver positions, as they are shown schematically in FIG. 7 for an emitter and several receiving antennas. Obviously, a plurality of emitters is also possible. Here, in principle, the necessitated number of emitter signals can be generated by standard measurement technology, which consists of a combination of a so-called arbitrary waveform generator (AWG) with a frequency converter. However, the disadvantage of this method is that respective memory requirements in an AWG are comparatively high, since the emitter signals have to be stored in a transmittable signal bandwidth. In order to be able to simulate a 20 MHz wide spectrum for only 10 seconds, already approximately 1.5 gigabyte of data are necessitated. Further, the time needed for calculating the data is long and is normally by orders of magnitude above the actual duration of the emitter signal. Changing the transmitter or emitter configuration, respectively, in real time by user intervention is also not possible in such a configuration, which also presents a significant disadvantage. For avoiding this disadvantage it would be necessitated to use one AWG with variable clock frequency and frequency converter with variable center frequency per emitter. However, this is normally inefficient.

SUMMARY

According to an embodiment, an apparatus for generating a signal composed of a plurality of individual signals may have: a means for providing the plurality of individual signals in the time domain; a means for transforming the individual signals from the time domain to the frequency domain, each by a discrete Fourier transformation having a first length; a means for processing the individual signals transformed to the frequency domain, each depending on a signal channel existing between a simulation location and a respective signal location; a means for combining the processed individual signals transformed to the frequency domain to a combined signal, wherein the means for combining is implemented to extend the bandwidth of the respective frequency domain of the discrete Fourier transformation to an output frequency domain; and a means for transforming the combined signal from the output frequency domain to the time domain by an inverse discrete Fourier transformation having a second length, for obtaining the combined signal, wherein the second length of the inverse discrete Fourier transformation is greater than the first length of the respective discrete Fourier transformation due to the extended output frequency domain.

According to another embodiment, a method for generating a signal composed of a plurality of individual signals may have the steps of: providing the plurality of individual signals in the time domain; transforming the individual signals from the time domain to the frequency domain each by a discrete Fourier transformation having a first length; processing the individual signals transformed to the frequency domain each depending on a signal channel existing between the simulation location and the respective signal location; combining the processed individual signals transformed to the frequency domain to a combined signal, wherein during combining a bandwidth of the respective frequency domain of the discrete Fourier transformation is extended to an output frequency domain; and transforming the combined signal from the output frequency domain to the time domain by an inverse discrete Fourier transformation IFFT having a second length for obtaining the simulated combined signal, wherein the second length of the inverse discrete Fourier transformation is greater than the first length of the respective discrete Fourier transformation due to the extended output frequency domain."

Another embodiment may have a computer program having a program code for performing the inventive method for simulating a combined signal when the computer program runs on a computer.

The present invention is based on the knowledge that phase, frequency and level differences of the individual signals of the plurality of signals are not simulated continuously in the time domain, but that the simulation of the signal composed of the plurality of individual signals from respective signal locations is realized at one simulation location, such that the different features of the emitted individual signals are simulated partly in the time domain and partly in the frequency domain.

Therefore, the emitter signals are provided as time function in the complex baseband in the time domain. In embodiments of the present invention, the emitter signals are therefore stored in an appropriate memory as time function in the complex baseband with different but firmly defined sampling rates. In a next step, the emitter signals are transformed from the time domain to the frequency domain. According to embodiments of the present invention, the individual time-varying emitter signals are therefore transformed in blocks or segments, respectively, by a short fast Fourier transformation (FFT) to a baseband frequency domain. Then, the emitter signals transformed to the frequency domain are each processed or manipulated, respectively, depending on a signal channel existing between the simulation location and the respective signal location. In the frequency domain, temporal delays of the individual signals can be fine-tuned, i.e. in the subsample domain, by the displacement law of the Discrete-Fourier-Transformation (DFT) as well as be provided with an attenuation of the simulated propagation or signal channel, respectively. Subsequently, the emitter signals transformed to the frequency domain are combined to a combined signal in the frequency domain. Therefore, according to embodiments, the baseband frequency domain of the individual signals is extended to an output frequency domain, i.e. according to embodiments a plurality of bins of the short FFT are enlarged, in order to be able to shift the baseband signals transformed to the frequency domain each to an intermediate or carrier frequency domain, respectively. When the individual emitter signals are each shifted to their intermediate or carrier frequency domain, respectively, the same are combined to the combined signal or overall signal, respectively, by the combination means. Subsequently, the combined signal in the frequency domain is transformed to the time domain for obtaining a simulated combined signal at the simulation location. Therefore, according to embodiments, the overall signal is transformed back to the time domain by an inverse fast Fourier transformation (IFFT). Here, it has to be noted, that the length of the IFFT is greater than the length of the input-side short FFT for frequency transformation of the individual emitter signals due to the extended output frequency domain.

In further embodiments of the present invention, the output signal in the time domain can be converted to an analog time signal by a digital-analogue converter (DAC), to supply the same subsequently to a receiver or radio direction finder, respectively, to be tested.

For simulating a frequency spectrum occupancy as realistically as possible, it is mainly necessitated to be able to simulate as many relatively narrow-band transmitters or emitters, respectively, as possible. The inventive concept has the advantage that with a high number of emitters, in particular narrow-band emitters, the resource requirements for simulating the signal composed of a plurality of individual signals are low. This is in particularly due to the fact that for transforming the individual signals to the frequency domain, a FFT with comparatively short length is used, whereas for calculating the combined output signal, an IFFT with greater length is used. Due to the short input-side FFT length, a high number of emitters can be simulated with little effort.

It is a further advantage of embodiments of the present invention that essential processing steps for simulating the individual signals can be easily parallelized and thus can be computed on separate hardware platforms. Additionally, in domains with low clock rate, i.e. in domains for simulating the individual signals in the baseband, a significant reduction of the effort with regard to the used resources can be obtained by time multiplexing. A further advantage is the simple structuring of the implementation of embodiments of the present invention, which is thus easily scalable.

It is another advantage of embodiments of the present invention that the number of processing steps to be clocked in a fast manner, that are operated in an order of magnitude of a system clock, rises only disproportionally with the number of simulated transmitters or emitters, respectively.

BRIEF DESCRIPTION OF THE DRAWINGS

Embodiments of the present invention will be detailed subsequently referring to the appended drawings, in which.

DETAILED DESCRIPTION OF THE INVENTION

With regard to the following description, it should be noted that similar or equal functional elements have the same reference numbers in the different embodiments and thus the description of these functional elements can be interchanged in the different embodiments presented below.

Figure 1:
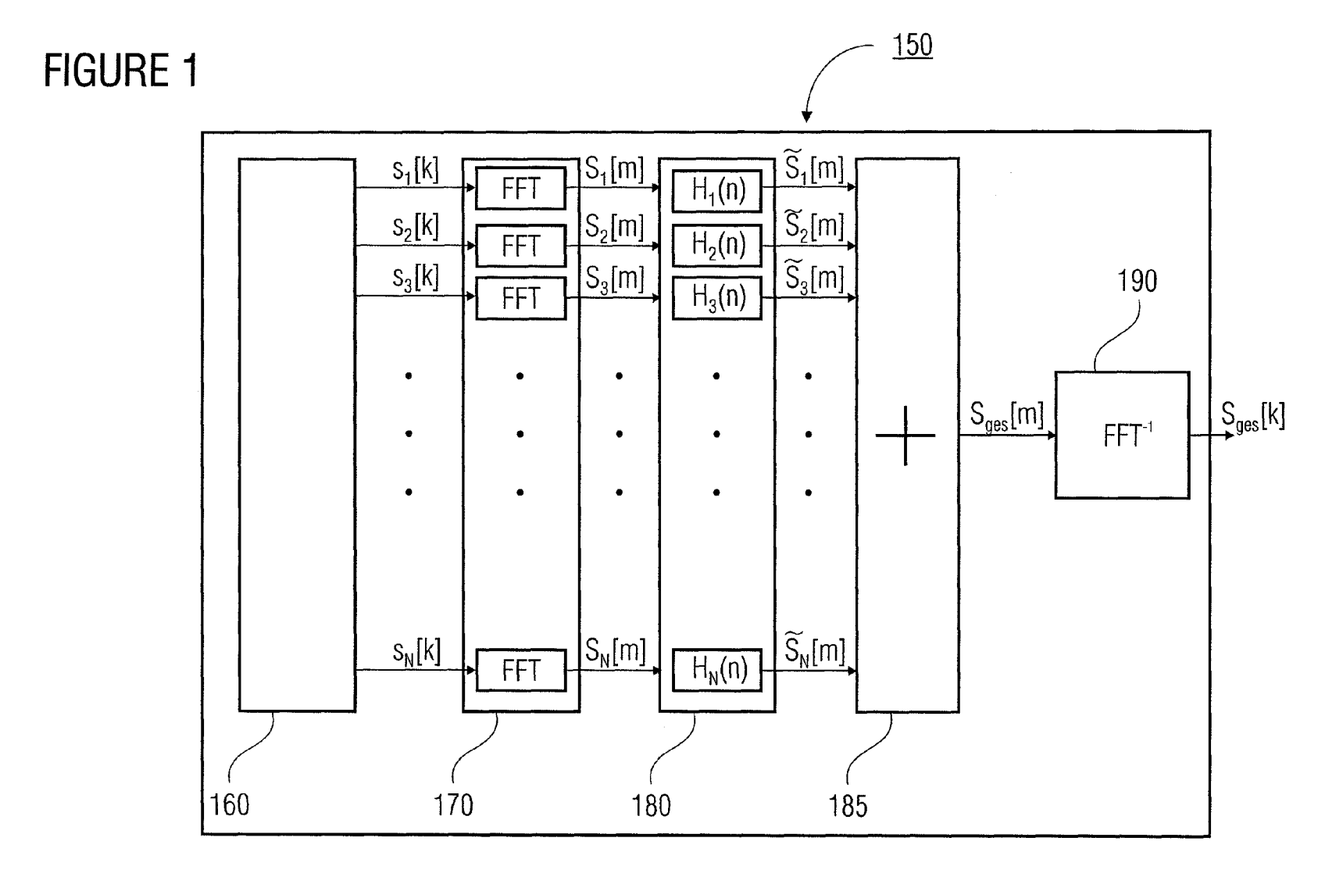
FIG. 1 is an apparatus for simulating a signal composed of a plurality of signals according to an embodiment of the present invention.

FIG. 1 shows a block diagram of an apparatus for simulating a signal composed of a plurality of individual signals from respective signal locations at a simulation location according to an embodiment of the present invention.

The apparatus 150 comprises a means for providing the plurality of time-discrete baseband individual signals $s_1[k]$ to $s_N[k]$ in the time domain, a means 170 for transforming the time-discrete individual signals $s_1[k]$ to $s_N[k]$ to a frequency-discrete baseband frequency domain, a means 180 for processing the individual signals $s_1[m]$ to $s_N[m]$ transformed to the baseband frequency domain, a means 185 for combining the processed individual signals $\tilde{S}_1[m]$ to $\tilde{S}_N[m]$ transformed to the frequency domain to a combined signal $s_{ges}[m]$ in the frequency domain, and a means 190 for transforming the combined signal $S_{ges}[m]$ in the frequency domain to the time domain for generating the simulated combined time-discrete signal $s_{ges}[k]$ in the time domain at the simulation location.

According to embodiments of the present invention, the means 160 for providing can have, for example, a memory, in which at least some of the emitter signals $s_1[k]$ to $s_N[k]$ are stored as time function in the complex baseband with different but firmly defined sampling rates $1/T_1$ to $1/T_N$, wherein $T_n$ (n=1, 2, ..., N) means a period of a sampling period of an emitter signal $s_n[k]$ to $s_N[k]$. The memory can, for example, be a RAM (random access memory) or a hard drive memory that does not have to be integrated in the means 160 for providing or in the apparatus 150 for simulating, respectively. An external memory is, for example, possible. According to further embodiments of the present invention, the individual emitter signals $s_1[k]$ to $s_N[k]$ could, for example, also be generated and provided in real time.

According to further embodiments of the present invention, the means 160 for providing has interpolation filters with different interpolation factors $X_n$ (n=1, 2, ..., N) for bringing the narrow-band emitter signals $s_1[k]$ to $s_N[k]$ each to a higher sampling rate $1/T_n'$ (n=1, 2, ..., N), wherein $T_n'=T_n/X_n$. The sampling rate increase has the purpose that, on the one hand, a minimum practically useful FFT length $L_{FFT,n}$ (n=1, 2, ..., N) for each of the N baseband individual signals is not undershot at a later time, and on the other hand, that an impulse response of a subsequent interpolation stage in the frequency domain can be selected to be sufficiently short.

In further embodiments of the present invention, the means 160 for providing can further have a digital mixer and an numerically controlled oscillator (NCO). Thereby, the digital mixer is used for combining the individual interpolated baseband signals with a harmonic signal $s_{NCO}[k]$ generated by the NCO. Typically, a NCO comprises a direct digital synthesizer (DDS), which increases a phase counter on a sampling interval basis.

Thus, the digital mixer and the NCO allow an adjustable frequency shift of the emitter signals, in particular the interpolated emitter signals with a finer resolution than possible by applying the displacement law of the DFT with the connection between FFT and IFFT. Here, the DFT s[m] of a finite time-discrete sequence s[k] of the length K can be generally written as $$S[m] = \sum_{k=0}^{K-1} s[k] W_K^{mk}.$$

It follows that the inverse DFT is calculated according to $$s[k] = \frac{1}{K}\sum_{m=0}^{K-1} S[m] W_K^{-mk},$$

wherein $W_K = e^{-j2\pi/K}$. The displacement law of the DFT indicates generally that a shift in the time domain effects a multiplication of the spectrum of a non-time-shifted sequence with a linear-phase term, i.e.

$$s[k-l] \xrightarrow{DFT} W_K^{m\cdot l} S[m].$$

However, the shift has to be a full number of samples, i.e. $l \in Z$. Also, a shift of the spectrum by the angular frequency in the time domain corresponds to a modulation with this frequency, i.e.

$$W_K^{-k\cdot l} s[k] \xrightarrow{DFT} S[m-l].$$

For filtering the complex baseband signals $s_1[k]$ to $s_N[k]$ each with a low pass filter with a finite impulse response $h_1[k]$ according to the invention, a block-wise fast convolution can be used, wherein the signal $s_n[k]$ (n=1, ..., N) to be filtered is divided into segments of the length L. Each segment can be convoluted with the finite impulse response $h_1[k]$ of the length P, and the filtered segments can then be combined again in an appropriate manner. If a segment of the signal to be filtered $s_n[k]$ (n=1, ..., N) has the length L, and impulse response $h_1[k]$ the length P, the linear convolution of these two sequences has the finite length (L+P−1). Since the DFT of the convolution of the two sequences, which is (L+P−1) samples long, is to describe the DFT of the linear convolution of $s_n[k]$ and $h_1[k]$, the DFT of a segment of the signal to be filtered $s_n[k]$ (n=1, ..., N) and $h_1[k]$ has to be calculated for this length (L+P−1). I.e. both the segments of $s_n[k]$ (n=1, ..., N) as well as $h_1[k]$ are advantageously extended by a sequence of zeros. This process is generally referred to as zero padding. For achieving this, according to embodiments of the present invention, the means 160 for providing comprises a so-called zero padding block. Additionally, the zero padding block has the function to coarsely adjust a desired time delay i of the respective (interpolated) emitter signal, i.e. with a temporal granularity of the sample interval $T_n'=T_n/X_n$, by reducing or increasing the length L by one for one block, and adapting the number of inserted zeros correspondingly.

According to embodiments of the present invention, the means 170 for transforming the individual emitter signals in the frequency domain N has FFT blocks, for transforming each individual one of the plurality of signals to the frequency domain by a short FFT, whose bandwidth is in the order of twice the bandwidth of an emitter signal plus the frequency shift $f_{NCO}$ by the NCO. If a segment of the emitter signal to be filtered has the length L, the same is extended by the zero padding block, to, for example, a length $L_{FFT,n}=2L>(L+P-1)$, for obtaining a bandwidth of the FFT in the order of twice the bandwidth of the baseband emitter signal. Each of the individual signals $S_n[m]$ (m=1, 2, ..., $L_{FFT,n}$; n=1, ..., N) transformed to the frequency domain is now multiplied with the DFT $H_{1,n}[m]$ of the impulse response $h_{1,n}[k]$ (m=1, 2, ..., $L_{FFT,n}$; n=1, ..., N) for achieving the convolution of the individual signals with the impulse response in the frequency domain.

In order to be able to process the individual signals $S_n[m]$ (m=1, 2, ..., $L_{FFT,n}$; n=1, ..., N) transformed to the frequency domain depending on a signal channel $H_{2,n}[m]$ (m=1, 2, ..., $L_{FFT,n}$; n=1, ..., N) existing between the simulation location and the respective signal location, the means 180 for processing comprises blocks where the individual signals $S_n[m]$ (n=1, ..., N) transformed to the frequency domain and multiplied by $H_1[m]$ can be multiplied with a phase shift term and an amplitude value. By the phase shift term of $H_{2,n}[m]$ a desired time delay and the phase position of the input signal $s_n[k]$ (n=1, ..., N) can be fine-tuned, i.e. in the subsample domain. With the amplitude or scalar value, respectively, of $H_{2,n}[m]$, for example, an attenuation of the propagation channel from the signal location to the simulation location can be simulated.

Further, according to an embodiment of the present invention, can be weighted $H_{1,n}[m]$ and/or $H_{2,n}[m]$ additionally such that errors in the frequency response of a signal transformed back to the time domain, subsequently digital-to-analog converted and analog further processed, can be compensated, wherein a DAC according to an embodiment of the present invention converts a signal $s_{ges}[k]$ composed of the individual emitter signals $S_n[m]$ (n=1, ..., N) and retransformed to the time domain to an analog time signal $s_{ges}(t)$, as will be described below. Further, according to a further embodiment of the present invention, this frequency response compensation can also be performed with a further separate filter $H_{3,n}[m]$ not shown in FIG. 2, which can present an advantage when implementing the inventive concept. Here, the frequency response compensation generally takes place by complex-valued weighting functions $H_{1,n}[m]$, $H_{2,n}[m]$, or $H_{3,n}[m]$.

With the complex weighting or transfer functions $H_{1,n}[m]$, $H_{2,n}[m]$, or $H_{3,n}[m]$, respectively, the individual signals transformed to the frequency domain can be modified with regard to their respective phase (constant phase), their respective delay (linearly increasing or decreasing phase), their respective amplitude (constant amount) as well as with regard to a possible compensation of errors in a downstream analog part (some type of complex function).

According to an embodiment of the present invention, the means 185 for combining comprises an adder matrix, which determines where an intermediate or carrier frequency, respectively, of the respective emitter signals $s_n[k]$ (n=1, ..., N) will be in an output frequency domain. According to one embodiment, this is obtained by extending the number of bins of the short FFT, which means by extending the frequency domain and positioning the frequency discrete output data $S_n[m]$ (m=1, 2, ..., $L_{FFT,n}$; n=1, ..., N) of the short FFT to appropriate positions or bins, respectively, in the extended output frequency domain. This corresponds practically to a shift of the individual baseband signals by a respective intermediate or carrier frequency, respectively, to an intermediate or carrier frequency domain. If several emitter signals are to be placed close to each other or even overlapping with regard to frequency, the output data $S_n[m]$ (m=1, 2, ..., $L_{FFT,n}$; n=1, ..., N) of the FFTs can strike the same bin in the output frequency domain. In this case, these data are added correspondingly. The data of the individual frequency bins of the output frequency domain form an input vector for an inverse fast Fourier transformation (IFFT), which is performed, according to an embodiment of the present invention, by the means 190 for transforming the combined signal $S_{ges}[m]$ from the frequency domain to the time domain.

Since L samples lie between two FFT input segments each, but each filtered segment has the length $L_{FFT,n} \geq (L+P-1)$, at least (P-1) non-vanishing values will overlap. These overlapping values have to be combined in the means 190 when performing summation or combination, respectively, of two subsequent output segments of the IFFT. This method for determining the filtered output signal, is frequently referred to as Overlap-Add-Method, since the filtered segments overlap and are added for determining the output signal. The combined time-discrete signal $s_{ges}[k]$ in the time domain obtained at the output of the means 190 can now be further processed for a test, for example of a radio direction finder.

Further embodiments of the inventive apparatus 150 for simulating a signal composed of a plurality of individual signals will be discussed in more detail below with reference to FIGS. 2 to 5.

Figure 2:
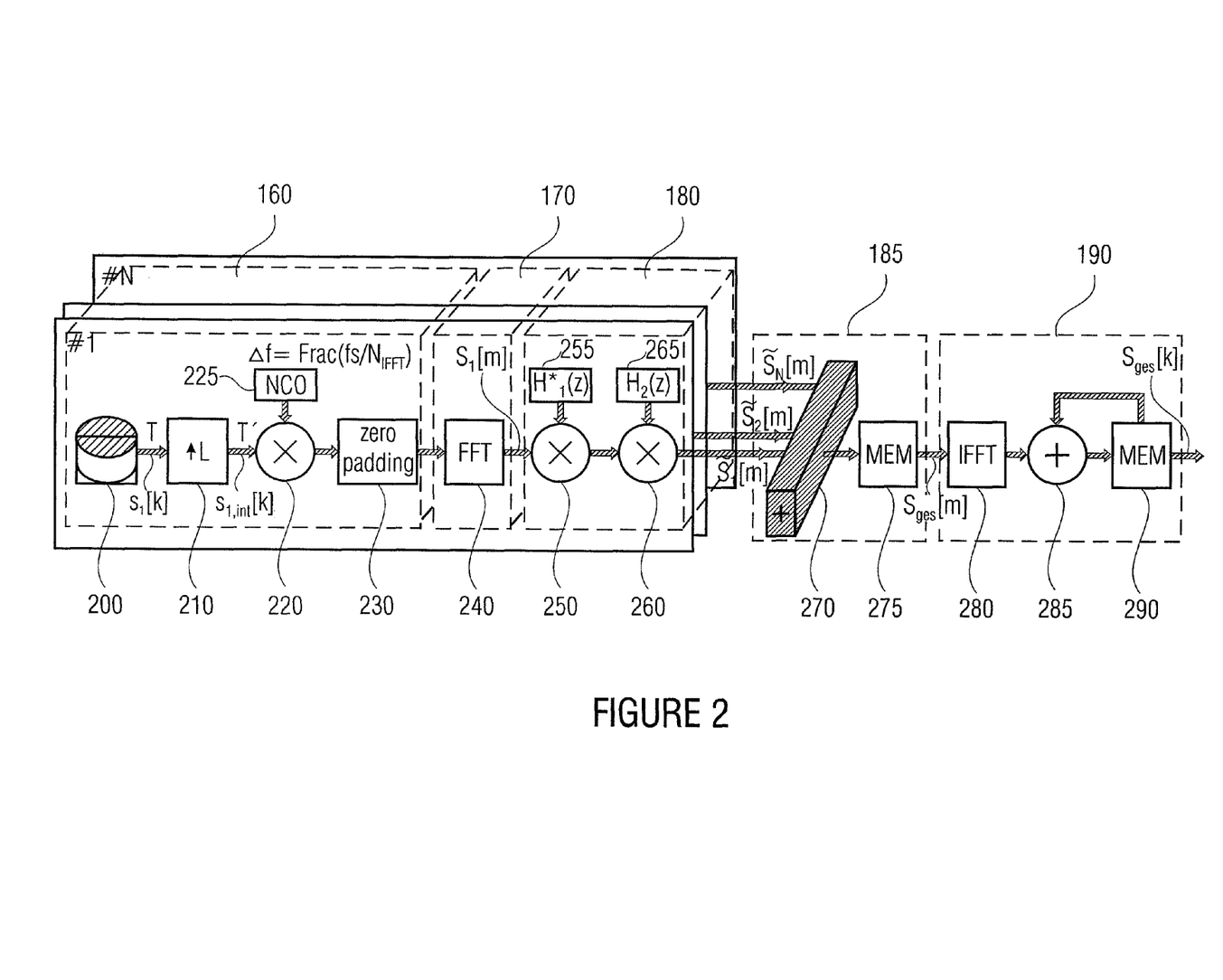
FIG. 2 is a block diagram of an apparatus for simulating a signal composed of a plurality of signals according to a further embodiment of the present invention.

FIG. 2 shows an embodiment of an inventive apparatus 150 for simulating a signal $s_{ges}[k]$ composed of a plurality of signals $s_n[k]$ (n=1, ..., N), comprising a means 160 for providing the plurality of individual signals $s_n[k]$ (n=1, ..., N) in the time domain, a means 170 for transforming the individual signals to the frequency domain, a means 180 for processing the individual signals $S_n[m]$ (m=1, 2, ..., $L_{FFT,n}$; n=1, ..., N) transformed to the frequency domain, a means 185 for combining the processed individual signals transformed to the frequency domain, and a means 190 for transforming the combined signal $S_{ges}[m]$ (m=1, 2, ..., $L_{IFFT}$) in the frequency domain to the time domain.

The means 160 for providing the N individual signals to the frequency domain comprises a memory 200, in which the individual signals $s_n[k]$ (n=1, ..., N) are stored as time functions in the complex baseband with different but firmly defined sampling rates $1/T_n$. The memory 200 can be, for example, a RAM or hard-disk memory. A sampling sequence of an individual signal $s_n[k]$ (n=1, ..., N) output by the memory 200 is brought to a higher sampling rate by an interpolation filter 210 included in the means 160. According to embodiments of the present invention, an increase factor $X_n$ (n=1, ..., N) of the sampling rate can be, for example, $X_n=1$, $X_n=2$ or $X_n=4$. Generally, $X_n$ can adopt any, advantageously integer, values. The increase of the sampling rate has the purpose that, on the one hand, a practically minimum useful FFT length $L_{FFT,n}$ is not undershot for later processing steps, and, on the other hand, that an impulse response $h_{1,n}[k]$ of a subsequent interpolation stage in the frequency domain can be selected to be sufficiently short. The discrete Fourier transform of the output signal of the interpolator $s_{n,int}[k]$ (n=1, ..., N) is a frequency-scaled version of the Fourier transform of the input signal $s_n[k]$ (n=1, ..., N).

Figure 3A:
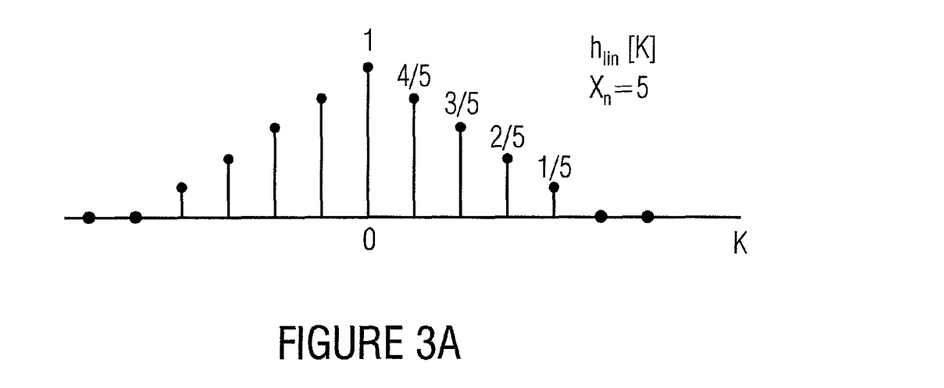
FIG. 3a-c are schematic illustrations for explaining the mode of operation of an interpolation filter according to an embodiment of the present invention.

The interpolation filter 210 can, for example, be a linear interpolator, whose impulse response is exemplarily shown in FIG. 3a for $X_n=5$, i.e. a sampling rate increase by the factor $X_n=5$. Such a linear interpolation filter generally has an impulse response of $$h_{lin} = \begin{cases} 1 - \frac{|n|}{x}; & |k| \leq x \\ 0, & \text{otherwise.} \end{cases}$$

Figure 3B:
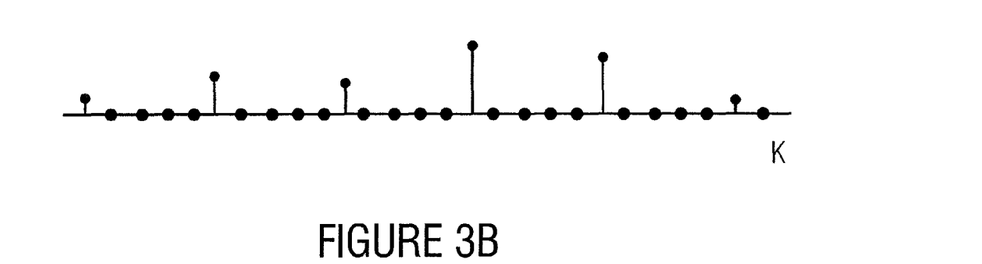
Figure 3C:
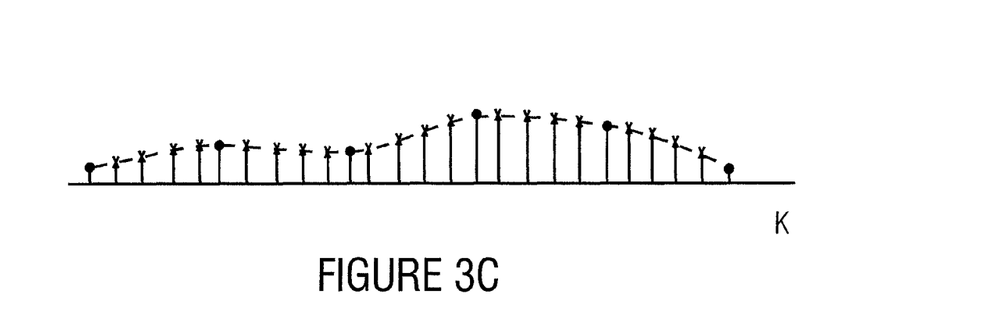

For increasing the sampling rate by a factor X, generally, X−1 zeros are inserted between two subsequent samples of the input sequence, as it is schematically illustrated in FIG. 3b. By filtering a signal increased in its sampling rate with the linear filter, a signal as shown schematically in FIG. 3c results. A typical range of the sampling rate after the interpolation filter 210 for an emitter signal $s_{n,int}[k]$ (n=1, ..., N) is 312.5 kS/s (kS/s=kilo samples per second) to 10 MS/s (MS/s=mega samples per second). Depending on the application of the inventive concept, smaller or larger sampling rates, respectively, are possible.

The signal $s_{n,int}[k]$ (n=1, ..., N) increased in its sampling rate at the output of the interpolation filter 210 is mixed with a harmonic signal $s_{NCO,n}[k]$ generated by a NCO 225 by a digital mixer 220. The harmonic signal generated by the NCO 225 serves for an adjustable frequency shift of the emitter signal with a finer resolution than by applying the displacement law of the DFT at the connection between FFT and IFFT. Here, the emitter signal $s_{n,int}[k]$ (n=1, ..., N) is shifted by a small frequency amount $f_{NCO,n}$, for example for simulating a Doppler shift or a local oscillator detuning in a receiving branch of a radio direction finder.

The interpolated and frequency-shifted emitter signal is divided to segments or blocks, respectively, of the length L=±1 by a zero-padding block 230 at the output of the digital mixer 220. By the above described zero padding, the individual blocks are brought to a length of $L_{FFT} \geq (L+P-1)$, for providing a block-wise convolution of the interpolated and frequency-shifted emitter signal with an impulse response $h_1[k]$ of the length P, wherein this convolution is performed for complexity reduction in the frequency domain. The zero-padding block 230 does not only serve for zero padding, but also for coarsely adjusting a desired time delay of the respective emitter signal $s_{n,int}[k]$ (n=1, . . . , N). Here, a time delay can be accomplished in a raster with a granularity of the sampling period $T_n'$. This connection is illustrated in FIG. 4.

Figure 4:
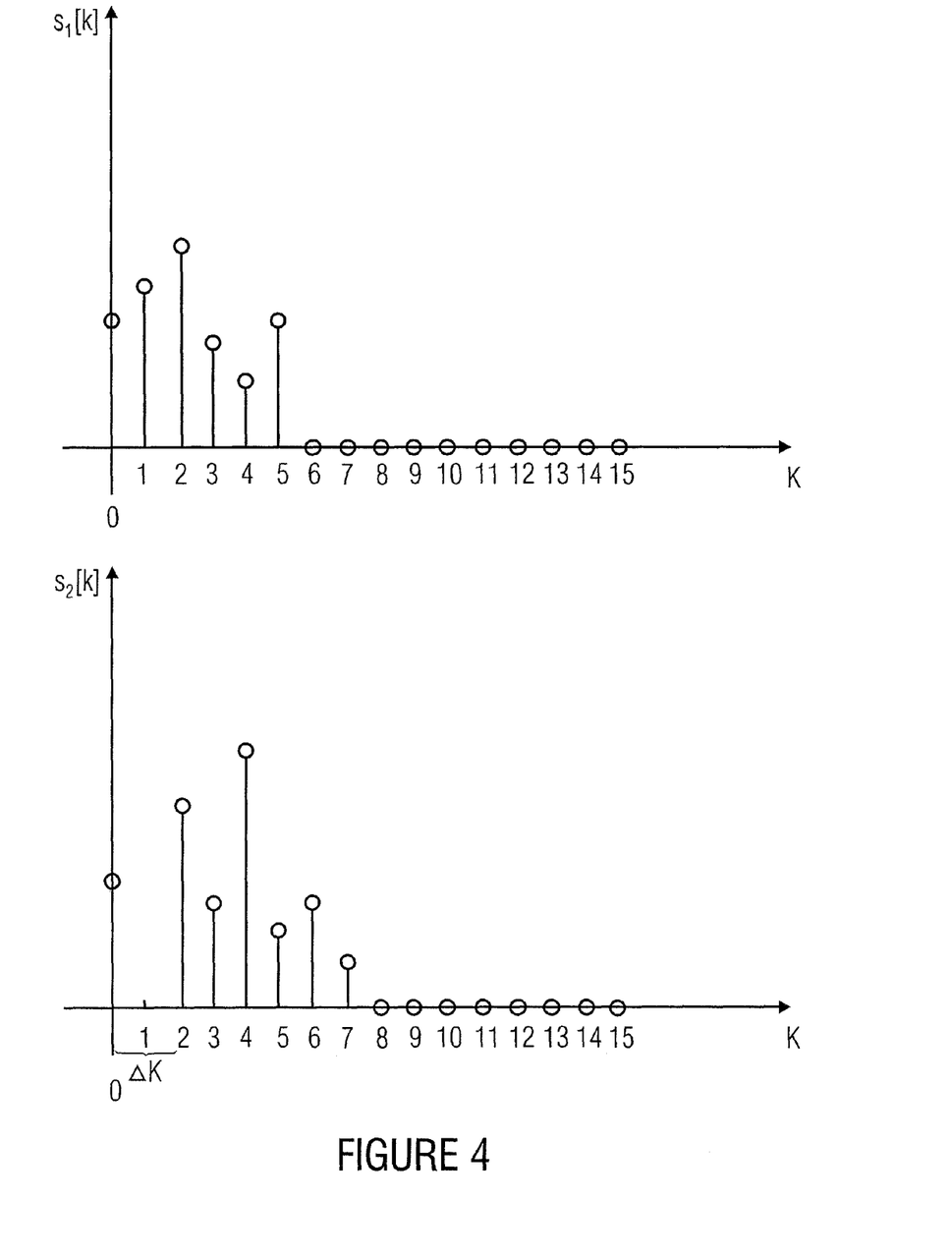
FIG. 4 is a schematic illustration for explaining the mode of operation of a zero padding rule according to an embodiment of the present invention.

FIG. 4 shows exemplarily a segment of the signal $s_{1,int}[k]$ of the length L=6, which is padded by zeros, for obtaining a length $L_{FFT,1}=16$. Further, FIG. 4 shows a segment of a signal $s_{2,int}[k]$ of the length L=6, which is delayed by two sampling periods $T_2'$, and is additionally padded by zeros to a total length of $L_{FFT,2}=16$.

According to further embodiments of the present invention, the signals $s_{n,int}[k]$ are not shifted against each other for effecting a coarse time delay. Rather, when needed, for example L+1 or L−1, respectively, samples are used for one segment for obtaining a time offset in relation to others of the emitter signals. In that way, advantageously, reaching the end of the window of the length $L_{FFT,n}$ shown in FIG. 4 due to a time shift can be avoided. One condition therefore is, however, that typically at least one zero more than needed is padded.

For calculating the fast convolution, the zero padded segment of the length $L_{FFT,n}$ is transformed to the frequency domain with a FFT algorithm for efficiently calculating the DFT in the block 240. Here, the length $L_{FFT,n}$ of the FFT can be configured from, for example, $L_{FFT}=32$ corresponding to an emitter signal sampling rate $1/T_n'$ of 312.5 kS/s to $L_{FFT}=1024$ corresponding to an emitter signal sampling rate of 10 MS/s. The narrower the band of an emitter signal, i.e. the smaller the emitter signal sampling rate, the more emitter signals can be simulated with the inventive concept. According to embodiments of the present invention, different algorithms can be used for calculating the FFT, such as, for example, Radix-$2^x$-algorithms (x=1, 2, . . . ), or also the Winograd algorithm. Here, the selection of the FFT algorithm depends, among other things, on the length $L_{FFT,n}$ of the FFT.

The output signal segment $S_n[m]$ (m=1, 2, . . . , $L_{FFT,n}$; n=1, 2, . . . , N) transformed to the frequency domain of the FFT block 240 is now multiplied with a frequency-transformed impulse response $H_{1,n}[m]$ (m=1, 2, . . . , $L_{FFT,n}$; n=1, 2, . . . , N) by a digital mixer 250, which corresponds to a convolution in the time domain. Here, $H_{1,n}[m]$ represents the frequency-transformed impulse response of a low pass or interpolation filter, respectively. $H_{1,n}[m]$ ensures that the output data, i.e. the segments of the FFT block 240, do not over convolute, because otherwise a subsequent cyclic shift for adapting the frequency to an intermediate or carrier frequency domain, respectively, will not work. Thus, it is advantageous that $H_{1,n}[m]$ has values of zero at the edges.

The interpolation of the emitter signals $s_n[k]$ (n=1, . . . , N) by the factor L comprises an expansion of the (band-limited) input signals $s_n[k]$ with L−1 zeros per sample k. Thereby, the respective spectrum becomes periodical and the signal appears L-times in the spectral domain. One of these L "images" is selected by the interpolation filter $H_{1,n}[m]$, normally a low-pass, sometimes a band-pass filter, and the rest are suppressed. When implementing the convolution in the frequency domain the fact that samples of $H_{1,n}[m]$ in the frequency domain are mostly zero due to the narrow-band emitter signals $s_n[k]$ and the large interpolation factors (e.g. 128) is used. These digits do not have to be calculated and thus a short FFT is sufficient.

The convolution in the frequency domain necessitates that at least as many zeros are added to the input data of the FFT block 240 as the impulse response of $H_{1,n}[m]$ is long, or to the length to which these can be reduced with regard to the allowable errors. It follows that $H_{1,n}[m]$ is selected such that the impulse response is short enough so that the FFT 240 does not have to be selected too long. Further, the usable frequency domain of the respective emitter signal should not be limited too much by $H_{1,n}[m]$.

A realization of $H_{1,n}[m]$ according to an embodiment of the present invention is a half-band filter having a pass bandwidth of 0.2 normalized to the usable frequency domain, and a stop band attenuation of 80 dB starting from 0.8 of the usable frequency domain. The associated impulse response has, for example, a length of 15 and can thus be easily accommodated in a short FFT with the length $L_{FFT,n}=32$ (i.e. 16±1 useful data, 15 . . . 17 zeros). Thereby, the bandwidth of the useful signal is limited to 0.2-times the sampling frequency $1/T_n$ (n=1, 2, . . . , N), which, however, presents no limitation in practice, since this can be ensured by an interpolation with the factor 2 in the stage 210. Thus, the input signal from 200 can have a (normalized) bandwidth of 0.4, which is practical. According to embodiments, stage 210 is clocked so slow that the computing effort therefore can be practically neglected.

The emitter signal low pass filtered by the digital mixer 250 and the DFT $H_{1,n}[m]$ in the frequency domain is subsequently multiplied with the DFT $H_{2,n}[m]$ (m=1, 2, . . . , $L_{FFT}$; n=1, 2, . . . , N) by a further digital mixer 260, and thereby, a desired time delay or phase position, respectively, of the input signal $S_n[k]$ (n=1, 2, . . . , N) is fine-tuned. Thus, the function $H_{2,n}[m]$ represents a linear relationship between frequency and phase. Here, it has to be noted that according to embodiments of the present invention the order of the multiplication with the two transfer functions $H_{1,n}[m]$ and $H_{2,n}[m]$ can also be interchanged, i.e. that the distributive law can be applied. By a scalar value in the function $H_{2,n}[m]$, additionally, an amplitude or attenuation, respectively, of a channel from the n-th emitter to the simulation location or the location of the receiver can be adjusted. An earlier change of the amplitude of the emitter signal in the signal chain, for example in the time domain, is also possible according to further embodiments of the present invention, but would cause greater computing inaccuracies.

In the embodiment of the present invention shown in FIG. 2, signal processing of the previously described means 200 to 265 for simulating the N emitter signals is paralellized in N blocks, as it is indicated in FIG. 2. I.e. the processing steps in blocks #1 to #N can also be computed on separate hardware platforms.

The individual output signals $\tilde{S}_n[m]=S_n[m]\cdot H_1[m]\cdot H_{2,n}[m]$ (m=1, 2, . . . , $L_{FFT}$; n=1, 2, . . . , N) of blocks #1 to #N are now the Fourier transforms of the length $L_{n,FFT}$ of the time-delayed and attenuated individual signals in the baseband. For shifting the N baseband signals to their respective intermediate or carrier frequency domain, respectively, the length $L_{n,FFT}$ of the input or baseband frequency domain, respectively, is enlarged to a greater length $L_{IFFT} > L_{n,FFT}$ of an output frequency domain for a signal $S_{ges}[m]$ composed of the N individual signals. Here, the number of bins for the output frequency domain is $L_{IFFT}$, wherein $L_{IFFT}=4096$ according to one embodiment. Depending on the bandwidth of the N emitter signal, a ratio $L_{IFFT}/L_{n,FFT}$ of the lengths is $L_{IFFT}/L_{n,FFT} \geq 4$. The bandwidth $\Delta f$ an individual FFT bin is identical both for the short FFT and the longer IFFT.

Figure 5:
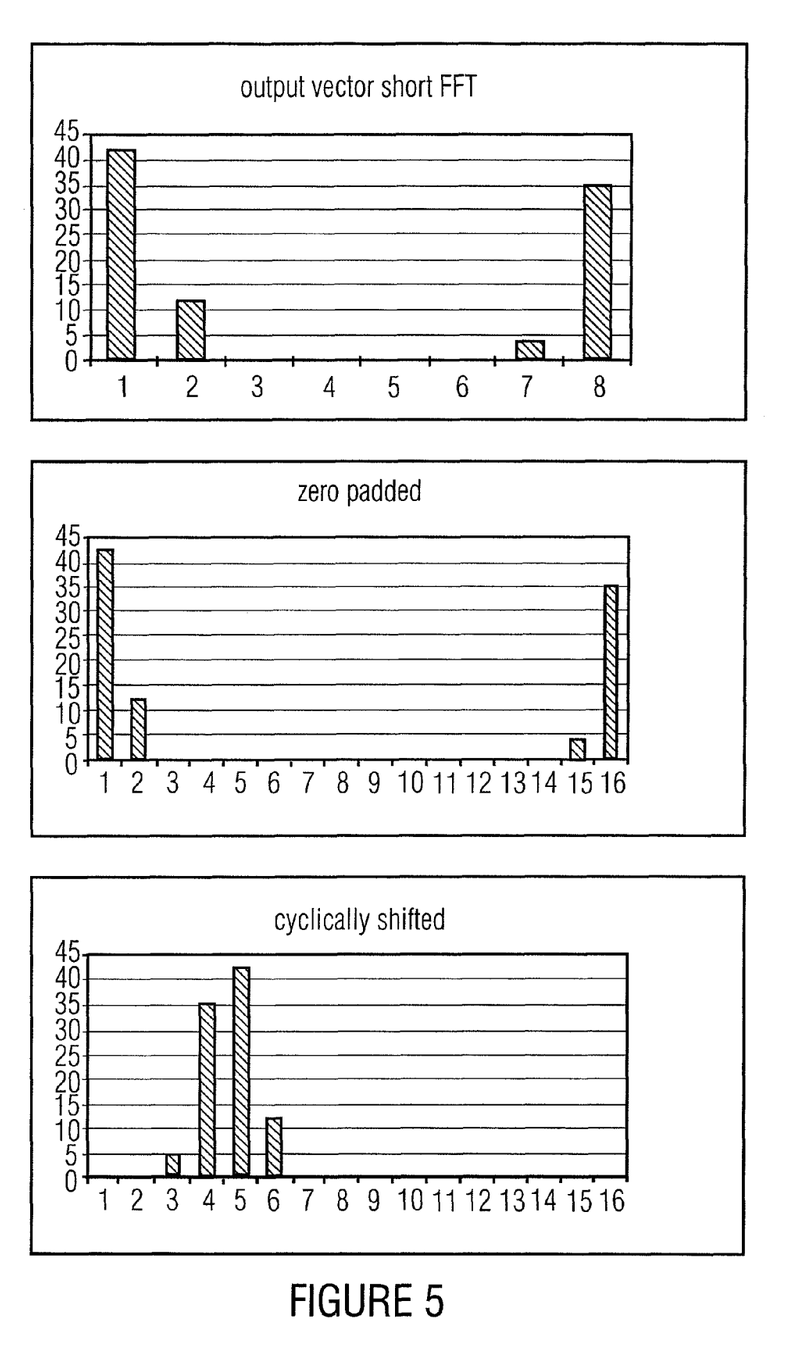
FIG. 5 is a schematic illustration for explaining the extension of the baseband frequency domain of the transformed individual signals to an output frequency domain according to an embodiment of the present invention.

FIG. 5 shows schematically the process when shifting the Fourier-transformed, time-delayed and attenuated individual signals in the baseband to their respective intermediate or carrier frequency domains, respectively.

FIG. 5 shows exemplarily a Fourier transform $S_n[m]$ of the length $L_{FFT}=8$. The length $L_{FFT}=8$ of the input or baseband frequency domain, respectively, is extended to a greater length $L_{IFFT}=16$ of an output frequency domain, i.e. the frequency domain is doubled in the scenario shown in FIG. 5. Subsequently, the baseband signal is shifted by $4\Delta f$ to an intermediate or carrier frequency domain, respectively.

The length $L_{FFT,n}$ of the output vector of the short FFT ($L_{FFT,n}=8$ in FIG. 5) shown exemplarily in the upper part of FIG. 5 is brought to the length $L_{IFFT}$ of the input vector of the IFFT ($L_{IFFT}=16$ in FIG. 5), as it is shown exemplarily in the middle part of FIG. 5. Starting from the common FFT representation, where negative frequencies are in the upper half of the FFT output vector, zeros are thus inserted in the middle between the positive and negative frequency bins, until the negative frequencies are again placed at the upper end of the extended input vector of the IFFT. Shifting the frequency bins to the intermediate or carrier frequency domain, respectively, is performed cyclically according to embodiments, i.e. the negative frequencies migrate into the positive frequency domain again from the bottom, as it is shown in the bottom part of FIG. 5, where the baseband spectrum illustrated in the upper part of FIG. 5 is shifted by $4\Delta f$ to the intermediate or carrier frequency domain, respectively.

With an adder matrix shown in FIG. 2, which comprises the blocks 270 and 275, it is determined where in the output frequency domain the intermediate or carrier frequency, respectively, of the respective emitter will be placed. This is obtained by positioning the output data $\tilde{S}_n[m]$ of the FFT (baseband) to the appropriate positions in the output frequency domain. If there will emitters are to be placed close to each other or even overlapping, the output data $\tilde{S}_n[m]$ of the FFTs can strike the same bins in the output frequency domain. In that case, these output data are added correspondingly. If all N emitter signals are added in a frequency correct manner by the means 185, an output segment of the length $L_{IFFT}$ of the combined signal $S_{ges}[M]$ is transformed to the time domain by an IFFT 280. It follows that the spectral representation of all N emitters together is transformed back from the frequency domain to the time domain. By the ratio $L_{IFFT}/L_{FFT,n}$ a sampling rate conversion takes place in the time domain, each corresponding to the ratio of the length of the IFFT to the respective lengths $L_{FFT,n}$ of the FFTs for the individual emitters.

An output buffer following the IFFT block 280 consisting of blocks 285 and 290 provides for the data of the IFFT calculations to be added with the necessitated time offset, which corresponds to the zeros inserted by zero padding. Therefore, the values in the buffer 290 are read out and added in a time correct manner by the adder 285 (overlap add method). According to an embodiment of the present invention, the sampling rate at the output of the buffer 290 is B=40 MHz. According to an embodiment of the present invention, the length $L_{IFFT}$ is $L_{IFFT}=4096$ according to the bandwidth of a bin of $\Delta f=B/L_{IFFT}=9,765625$ kHz. There from, a memory depth of 4096 results for the blocks 275 and 285 in FIG. 2.

Figure 6:
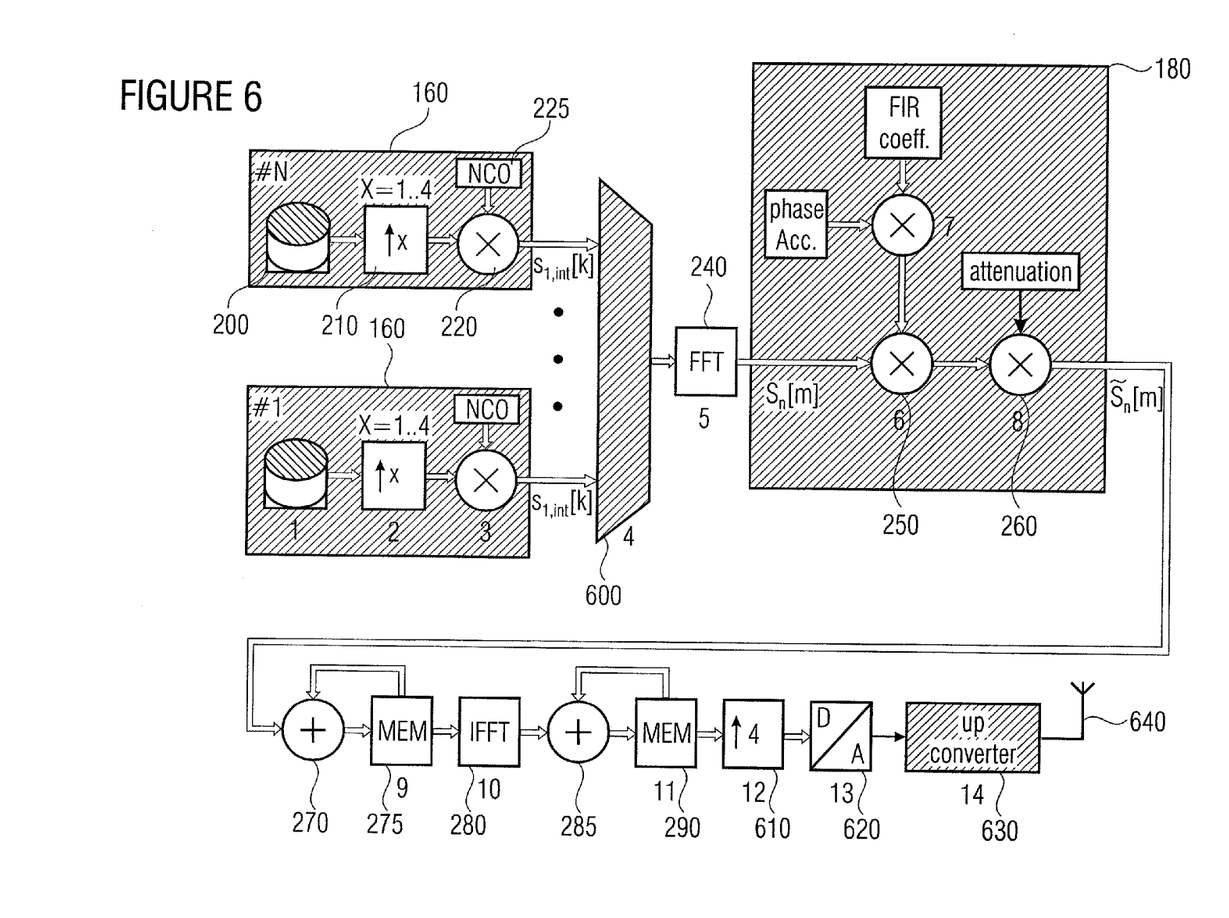
FIG. 6 is a block diagram of an apparatus for simulating a signal composed of a plurality of individual signals according to a further embodiment of the present invention.

A possible implementation of the inventive method shown in FIG. 2 can be performed in parallel or serial or semiparallel, respectively for several emitters. A serial variation uses sequential processing of operations in multiplexing with the help of the same resources. This reduces the resource requirement with a simultaneous need for multiplexers and a higher processing velocity. Therefore, FIG. 6 shows a further embodiment of the present invention, wherein the operations of blocks 230 to 275 of FIG. 2 are processed serially for all emitters.

After processing with blocks 200 to 225 (processing stages 1 to 3 in FIG. 6), the time signals $s_{n,int}[k]$ (n=1, ..., N) stored in a memory 200 and subsequently interpolated are provided a frequency-shiftable manner per emitter. With the help of a multiplexer 600 (processing stage 4 in FIG. 6), each of these emitter signals is transformed sequentially to the frequency domain by a short FFT 240 of the length $L_{FFT}$ (processing stage 5 in FIG. 6) and, with the means for processing 180, interpolated in the frequency domain with $H_{1,n}[m]$ (m=1, 2, ..., $L_{FFT}$; n=1, 2, ..., N) in the previously described manner, and a delay, phase and amplitude is set with $H_{2,n}[m]$ (m=1, 2, ..., $L_{FFT,n}$; n=1, 2, ..., N)(processing stages 5 to 8 in FIG. 6). The discrete values $\tilde{S}_n[m]=S_n[m]\cdot H_{1,n}[m]\cdot H_{2,n}[m]$ (m=1, 2, ..., $L_{FFT,n}$; n=1, 2, ..., N) generated in that manner are correspondingly positioned in the output frequency domain in the memory 275 after extending the frequency domain of the FFT and possibly added with the adder 270, when the same overlap. Thereby, in the embodiment of the present invention shown in FIG. 6, the spectra of all emitter signals 1 to N are available within the bandwidth $B=\Delta f\cdot L_{IFFT}$ of the combined output signal $S_{ges}[m]$.

As has been described above, the downstream units 280 to 290 serve for the retransformation to the time domain. In the embodiment of the present invention shown in FIG. 6, a further sampling rate adaptation of the simulated combined signal $s_{ges}[k]$ takes place at the simulation location by the downstream block 610. Then, the time-discrete simulated combined signal $s_{ges}[k]$ is converted to the analog domain with a D/A converter 620, i.e. $s_{ges}[k] \rightarrow s_{ges}(t)$. If the simulated combined analog signal $s_{ges}(t)$ is in an intermediate frequency domain after the transformation of the combined signal in the frequency domain to the time domain, the simulated combined signal $s_{ges}(t)$ can be shifted to a desired frequency band with a downstream frequency converter 630 according to an embodiment of the present invention.

A list of resources for the computing multiplications in the embodiment of the present invention shown in FIG. 6 leads to the following estimation, wherein subsequently MM/MHz stands for mega-multiplications per MHz sum-bandwidth of all emitters.

processing stages 1 to 4: 30 MM/MHz
processing stage 5 (FFT): 280 MM/MHz
processing stages 6-8: 100 MM/MHz
processing stages 9-12: 3520 MM This results in the following estimated overall balance: 410 MM×(possible bandwidth of all N emitters combined)+3520 MM It follows that the inventive concept has the advantage that with a high number of emitters, in particular narrow-band emitters, the resource requirements for simulating the signal composed of a plurality of individual signals are low.

A further advantage of embodiments of the present invention is that essential processing steps for simulating the individual signals can be easily parallelized and can thus be computed on separate hardware platforms. Additionally, in domains with low clock rate, i.e. in domains for simulating the individual signals in the baseband, a significant reduction of the effort with regard to the used resources can be obtained by time multiplexing. A further advantage is the simple structuring of the implementation of embodiments of the present invention, which is thus easily scalable.

It is another advantage of embodiments of the present invention that the number of processing steps to be clocked in a fast manner, for example the IFFT, that are operated in an order of magnitude of a system clock, is independent of the number of simulated senders or emitters, respectively.

In summary, the inventive concept provides a method for generating several test signals in the HF domain of previously stored data, which is characterized by the fact that the stored data each comprise a signal sequence of an individual emitter as time function and not a combination of independent signals. The interpolation or sampling rate increase, respectively, is divided into an interpolation in the time domain and an interpolation in the frequency domain in the inventive method, wherein the FFT used on the input side during the interpolation in the frequency domain is shorter than the IFFT used on the output side. A possibly desired frequency offset of the emitter is divided into an integer part realized in the frequency domain and a fractional part realized in the time domain. Further, a possibly desired time offset of the emitter is divided into an integer part realized in the time domain and a fractional part realized in the frequency domain. An interpolation in the time domain before the short FFT is possible according to the embodiment of the present invention, but not absolutely needed. Thus, the inventive method does not use one filter chain per emitter for interpolation, but uses a combination of Fourier transformations.

In particular, it should be noted that, depending on the circumstances, the inventive scheme for simulating a signal composed of a plurality of individual signals from respective signal locations at a simulation location can also be implemented in software. The implementation can be on a digital storage medium, in particular a disk or a CD with electronically readable control signals, which can cooperate with a programmable computer system and/or microcontroller such that the respective method for simulating a signal composed of a plurality of individual signals from respective signal locations at a simulation location is performed. Thus, generally, the invention consists also of a computer program product with a program code stored on a machine readable carrier for performing the inventive method for simulating a signal composed of a plurality of individual signals, when the computer program product runs on a computer and/or microcontroller. In other words, the invention can be realized as a computer program with a program code for performing the method for simulating a signal composed of a plurality of individual signals, when the computer program runs on a computer and/or microcontroller.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for generating a signal composed of a plurality of individual signals, comprising:
   a provider for providing the plurality of individual signals in the time domain;
   a transformer for transforming the individual signals from the time domain to the frequency domain, each by a discrete Fourier transformation with a first length;
   a processor for processing the individual signals transformed to the frequency domain, each depending on a signal channel existing between a simulation location and a respective signal location;
   a combiner for combining the processed individual signals transformed to the frequency domain to a combined signal, wherein the combiner is implemented to extend the bandwidth of the respective frequency domain of the discrete Fourier transformation to an output frequency domain; and
   a transformer for transforming the combined signal from the output frequency domain to the time domain by an inverse discrete Fourier transformation with a second length, for acquiring the combined signal, wherein the second length of the inverse discrete Fourier transformation is greater than the first length of the respective discrete Fourier transformation due to the extended output frequency domain.

2. The apparatus according to claim 1, wherein the provider comprises a memory, in which the plurality of the individual signals are stored in the time domain with defined sampling rates.

3. The apparatus according to claim 1, wherein the provider comprises an interpolation filter in the time domain, in order to be able to increase the sampling rates of the individual signals.

4. The apparatus according to claim 1, wherein the provider further comprises a mixer for digitally mixing and a numerically controlled oscillator, in order to be able to shift the individual signals by an adjustable frequency of the numerically controlled oscillator.

5. The apparatus according to claim 1, wherein the provider comprises a zero padder in order to be able to pad signal portions of the individual signals with zeros, such that a time delay of an individual signal can be adjusted with a temporal resolution corresponding to the sampling rate of the individual signal.

6. The apparatus according to claim 1, wherein the transformer is implemented to transform signal portions of the individual signals each by a fast Fourier transformation FFT from the time domain to the frequency domain.

7. The apparatus according to claim 6, wherein a bandwidth of the FFT is in the order of twice the bandwidth of the individual signals plus the frequency shift by the numerically controlled oscillator.

8. The apparatus according to claim 1, wherein the processor is implemented to multiply the individual signals transformed to the frequency domain each with a Fourier transform of a filter.

9. The apparatus according to claim 8, wherein the filter is a low-pass filter.

10. The apparatus according to claim 1, wherein the processor is implemented to multiply the individual signals transformed to the frequency domain each with a transfer function of the existing signal channel, wherein the transfer function is complex-valued.

11. The apparatus according to claim 1, wherein the combiner is implemented to shift the frequency domains of the individual signals in the output frequency domain corresponding to the frequency shifts associated to the individual signals.

12. The apparatus according to claim 11, wherein the combiner is further implemented to add the FFTs of the individual signals across the output frequency domain to a combined signal in the frequency domain.

13. The apparatus according to claim 1, wherein a length of the IFFT to a length of the FFT corresponds to the ratio of output frequency domain to input frequency domain.

14. The apparatus according to claim 1, wherein the transformer is implemented to combine two subsequent temporal segments of the combined output signal transformed per IFFT by the overlap add method.

15. The apparatus according to claim 1, wherein the apparatus for simulating comprises an additional interpolation filter in the time domain for increasing the sampling rate of the simulated combined signal at the simulation location.

16. The apparatus according to claim 1, wherein the apparatus for simulating further comprises a digital-analog converter for converting the simulated combined signal at the simulation location to an analog signal.

17. The apparatus according to claim 1, wherein the apparatus for simulating further comprises a frequency converter for shifting the simulated combined signal to a defined frequency band.

18. The apparatus according to claim 1, wherein the apparatus for simulating comprises a multiplexer for transforming each of the individual signals sequentially to the frequency domain.

19. A method for generating a signal composed of a plurality of individual signals, comprising:
- by a computing device, providing the plurality of individual signals in the time domain;
- by the computing device, transforming the individual signals from the time domain to the frequency domain each by a discrete Fourier transformation with a first length;
- by the computing device, processing the individual signals transformed to the frequency domain each depending on a signal channel existing between the simulation location and the respective signal location;
- by the computing device, combining the processed individual signals transformed to the frequency domain to a combined signal, wherein during combining a bandwidth of the respective frequency domain of the discrete Fourier transformation is extended to an output frequency domain; and
- by the computing device, transforming the combined signal from the output frequency domain to the time domain by an inverse discrete Fourier transformation IFFT with a second length for acquiring the simulated combined signal, wherein the second length of the inverse discrete Fourier transformation is greater than the first length of the respective discrete Fourier transformation due to the extended output frequency domain.

20. Non-transitory computer-readable medium having stored thereon a program code for performing the method for generating a signal composed of a plurality of individual signals, the method comprising:
- providing the plurality of individual signals in the time domain;
- transforming the individual signals from the time domain to the frequency domain each by a discrete Fourier transformation with a first length;
- processing the individual signals transformed to the frequency domain each depending on a signal channel existing between the simulation location and the respective signal location;
- combining the processed individual signals transformed to the frequency domain to a combined signal, wherein during combining a bandwidth of the respective frequency domain of the discrete Fourier transformation is extended to an output frequency domain; and
- transforming the combined signal from the output frequency domain to the time domain by an inverse discrete Fourier transformation IFFT with a second length for acquiring the simulated combined signal, wherein the second length of the inverse discrete Fourier transformation is greater than the first length of the respective discrete Fourier transformation due to the extended output frequency domain, when the computer program runs on a computer.

* * * * *